United States Patent
Chang et al.

(10) Patent No.: US 9,435,936 B2
(45) Date of Patent: Sep. 6, 2016

(54) LIGHT GUIDE PLATE WITH MULTI-DIRECTIONAL STRUCTURES

(71) Applicant: Radiant Opto-Electronics Corporation, Kaohsiung (TW)

(72) Inventors: Chia-Yin Chang, Kaohsiung (TW); Po-Chang Huang, Kaohsiung (TW); Chih-Chiang Chang, Kaohsiung (TW); Shan-Fu Chang, Kaohsiung (TW); Shin-Bo Lin, Kaohsiung (TW)

(73) Assignee: Radiant Opto-Electronics Corporation, Kaohsiung (TW)

( * ) Notice: Subject to any disclaimer, the term of this patent is extended or adjusted under 35 U.S.C. 154(b) by 116 days.

(21) Appl. No.: 14/100,028

(22) Filed: Dec. 9, 2013

(65) Prior Publication Data
US 2015/0055366 A1   Feb. 26, 2015

(30) Foreign Application Priority Data

Aug. 20, 2013 (TW) ............................. 102129835 A

(51) Int. Cl.
F21V 8/00 (2006.01)
(52) U.S. Cl.
CPC ........... *G02B 6/0061* (2013.01); *G02B 6/0038* (2013.01); *G02B 6/0036* (2013.01)
(58) Field of Classification Search
CPC ............. G02B 6/0015–6/0043; G02B 6/0061; G02F 1/1336; G02F 1/133615; G02F 1/133606; G02F 1/133504
USPC .................... 362/617–628, 606–608; 349/62
See application file for complete search history.

(56) References Cited

U.S. PATENT DOCUMENTS

| 6,123,431 A * | 9/2000 | Teragaki | G02B 6/0036 362/333 |
| 7,457,510 B2 * | 11/2008 | Lee et al. | 385/146 |
| 7,618,164 B2 * | 11/2009 | Wang et al. | 362/339 |
| 7,936,420 B2 * | 5/2011 | Kim | G02B 6/0038 349/65 |
| 8,896,786 B2 * | 11/2014 | Seo et al. | 349/65 |

FOREIGN PATENT DOCUMENTS

| CN | 101329423 A | * | 12/2008 |
| CN | 201298087 Y | * | 8/2009 |
| TW | 201209463 A1 | | 3/2012 |
| TW | I402542 B | | 7/2013 |

* cited by examiner

*Primary Examiner* — Anh Mai
*Assistant Examiner* — Arman B Fallahkhair
(74) *Attorney, Agent, or Firm* — CKC & Partners Co., Ltd.

(57) ABSTRACT

A light guide plate with multi-directional structures includes a main body, a plurality of first microstructures and a plurality of second microstructures. The main body includes a light-incident surface, a light-emitting surface and a reflecting surface. The light-incident surface connects the light-emitting surface and the reflecting surface. The first microstructures are disposed on the light-emitting surface or the reflecting surface and arranged along a first extending direction. The second microstructures are disposed on the light-emitting surface or the reflecting surface and arranged along a second extending direction. The second microstructures and the first microstructures are disposed on the same plane and intersect with each other. Each of the second microstructures is a single stripe pattern, and has a width which becomes gradually smaller from one end of the second microstructure near the light-incident surface to the other end of the second microstructure away from the light-incident surface.

17 Claims, 6 Drawing Sheets

LIGHT GUIDE PLATE WITH MULTI-DIRECTIONAL STRUCTURES

RELATED APPLICATIONS

This application claims priority to Taiwan Application Serial Number 102129835, filed Aug. 20, 2013, which is herein incorporated by reference.

BACKGROUND

1. Field of Invention

The present invention relates to a light guide plate. More particularly, the present invention relates to a light guide plate with multi-directional structures.

2. Description of Related Art

A light guide plate has a light-incident surface, a light-emitting surface and a reflecting surface. Light emitted by a light source enters the light guide plate from the light-incident surface, and exits from the light-emitting surface. In order to mix the light pass through the light guide plate uniformly, microstructures (such as dotted microstructures or striped microstructures, a.k.a. lenticular microstructures) are generally disposed on the light-emitting surface or the reflecting surface of the light guide plate. However, the surfaces with dotted microstructures are rough and may scatter the light, such that the light exiting from the light-emitting surface of the light guide plate has a non-uniform direction, and its light energy is not concentrated, thus further resulting poor luminance.

Another conventional skill is to dispose striped microstructures with different extending directions on a light-emitting surface and a reflecting surface of a light guide plate. Luminance generated by the light guide plate with the striped microstructures is better than that by the light guide plate with dotted microstructures, but the light guide plate with the striped microstructures is likely to generate bright and dark lines which will affect optical appearance of the light guide plate.

Hence, there is need to develop a light guide plate to overcome the foregoing problems.

SUMMARY

One aspect of the present invention is to provide a light guide plate with multi-directional structures for simultaneously controlling light-emitting angles and optical trends of the light guide plate by alternately disposing first microstructures and second microstructures on the same plane of the light guide plate, thereby achieving light-mixing and more uniform light emitting effects. Furthermore, the uniformity of the overall light-emitting appearance of the light guide plate can be promoted by roughening or hazing surfaces of the first microstructures and second microstructures. In addition, the aforementioned first microstructures and second microstructures can be manufactured by using the existing microstructure processes or equipment without needing to additionally purchase new process equipment, and thus no additional cost burden is imposed to the manufacturing process.

According to the aforementioned objects, the present invention provides a light guide plate with multi-directional structures. The light guide plate includes a main body, a plurality of first microstructures and a plurality of second microstructures. The main body includes a light-incident surface, a light-emitting surface and a reflecting surface. The reflecting surface is opposite to the light-emitting surface. The light-incident surface connects the light-emitting surface and the reflecting surface. The first microstructures are disposed on the light-emitting surface or the reflecting surface, and the first microstructures are arranged along a first extending direction. The second microstructures are disposed on the light-emitting surface or the reflecting surface, and the second microstructures are arranged along a second extending direction. The second microstructures and the first microstructures are disposed on the same plane and intersect with each other. Each of the second microstructures is in a single stripe pattern, and has a width which becomes gradually smaller from one end of each of the second microstructures near the light-incident surface to the other end of each of the second microstructures away from the light-incident surface.

According to the aforementioned objects, the present invention provides another light guide plate with multi-directional structures. The light guide plate includes a main body, a plurality of first microstructures and a plurality of second microstructures. The main body includes at least one optical surface. The first microstructures are disposed on the at least one optical surface, in which the first microstructures are arranged along a first extending direction. The second microstructures are disposed on the at least one optical surface, in which the second microstructures are arranged along a second extending direction, in which the second microstructures and the first microstructures are disposed on the same plane and intersect with each other, in which each of the second microstructures is in a single stripe pattern, and has a width which becomes gradually smaller from one end of each of the second microstructures to the other end of each of the second microstructures.

According to an embodiment of the present invention, each of the first microstructures is intercepted by each of the second microstructures.

According to an embodiment of the present invention, the first extending direction is vertical to the second extending direction.

According to an embodiment of the present invention, each of the first microstructures or each of the second microstructures is a convex portion or a concave portion.

According to an embodiment of the present invention, when each of the second microstructures is the convex portion, a height of the convex portion becomes gradually smaller from the end of each of the second microstructures near the light-incident surface to the other end of each of the second microstructures away from the light-incident surface; when each of the second microstructures is the concave portion, a depth of the concave portion becomes gradually smaller from the end of each of the second microstructures near the light-incident surface to the other end of each of the second microstructures away from the light-incident surface.

According to an embodiment of the present invention, a cross-sectional profile of each of the first microstructures is in a V-shape or an inverted V-shape, and a first angle and a second angle are respectively included between two respective surfaces of each of the first microstructures and the light-emitting surface or the reflecting surface.

According to an embodiment of the present invention, a cross-sectional profile of each of the second microstructures is in a V-shape, an inverted V-shape, an arc-shape or a trapezoid-shape.

According to an embodiment of the present invention, every two adjacent first microstructures are equidistantly arranged, and every two adjacent second microstructures are equidistantly arranged.

According to an embodiment of the present invention, every two adjacent first microstructures are equidistantly arranged, and every two adjacent second microstructures are non-equidistantly arranged.

According to an embodiment of the present invention, every two adjacent first microstructures are non-equidistantly arranged, and every two adjacent second microstructures are equidistantly arranged.

According to an embodiment of the present invention, every two adjacent first microstructures are non-equidistantly arranged, and every two adjacent second microstructures are non-equidistantly arranged.

According to an embodiment of the present invention, at least one portion of the first microstructure has a hazy surface, a matte surface, a hair-lined surface or a rough surface.

According to an embodiment of the present invention, at least one portion of the second microstructure has a hazy surface, a matte surface, a hair-lined surface or a rough surface.

It is to be understood that both the foregoing general description and the following detailed description are by examples, and are intended to provide further explanation of the invention as claimed.

BRIEF DESCRIPTION OF THE DRAWINGS

The invention can be more fully understood by reading the following detailed description of the embodiment, with reference made to the accompanying drawings as follows.

DETAILED DESCRIPTION

Figure 1:
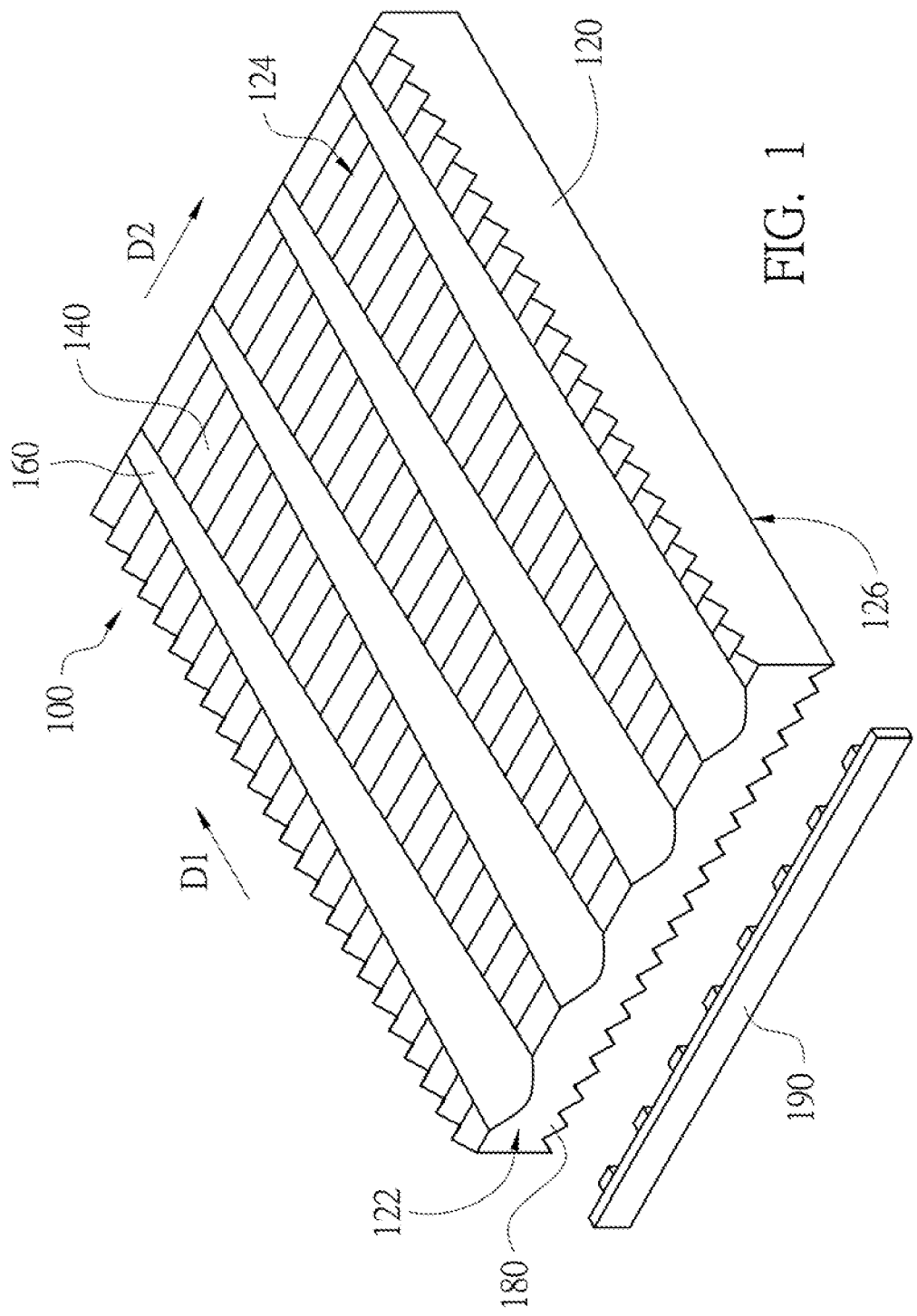
FIG. 1 is a schematic structural diagram showing a light guide plate with multi-directional structures in accordance with a first embodiment of the present invention.

Reference will now be made in detail to the present embodiments of the invention, examples of which are illustrated in the accompanying drawings. Wherever possible, the same reference numbers are used in the drawings and the description to refer to the same or like parts.

Referring to FIG. 1, FIG. 1 is a schematic structural diagram showing a light guide plate 100 with multi-directional structures in accordance with a first embodiment of the present invention. The light guide plate 100 of the present embodiment may be applied to a backlight module (not shown). The light guide plate 100 may include a main body 120, a plurality of first microstructures 140 and a plurality of second microstructures 160. By disposing the first microstructures 140 and the second microstructures 160 on the main body 120, the light guide plate 100 can change and adjust light-emitting beam angles and optical trends of the light guide plate 100.

In the light guide plate 100, the main body 120 may be a transparent element or other equivalents. The main body 120 mainly includes at least one optical surface, such as a light-incident surface 122, a light-emitting surface 124 and a reflecting surface 126. The reflecting surface 126 and the light-emitting surface 124 are respectively located on the two opposite sides of the main body 120. In addition, the light-incident surface 122 connects the light-emitting surface 124 and the reflecting surface 126. In other words, two opposite sides of the light-incident surface 122 are respectively connected to a side of the light-emitting surface 124 and a side of the reflecting surface 126. A light source 190 is disposed by the light-incident surface 122, and light emitted by the light source 190 may enter the light guide plate 100 from the light-incident surface 122. The first microstructures 140 and the second microstructures 160 are disposed on the same plane. In other words, the first microstructures 140 and the second microstructures 160 are simultaneously disposed on the optical surface of the main body 120. In the present embodiment, the first microstructures 140 and the second microstructures 160 are simultaneously disposed on the light-emitting surface 124 or the reflecting surface 126. In some embodiments, the first microstructures 140 and the second microstructures 160 are simultaneously disposed on both light-emitting surface 124 and reflecting surface 126. Moreover, the first microstructures 140 and the second microstructures 160 on the same plane may intersect with each other. In one embodiment, each of the first microstructures 140 is intercepted by each of the second microstructures 160.

As shown in FIG. 1, each of the first microstructures 140 is arranged on the light-emitting surface 124 along a first extending direction D1. Meanwhile, each of the second microstructures 160 is arranged on the light-emitting surface 124 along a second extending direction D2. Each of the second microstructures 160 is in a single stripe pattern. Moreover, each of the second microstructures 160 has a width which becomes gradually smaller from one end of each of the second microstructures 160 near the light-incident surface 122 to the other end of each of the second microstructures 160 away from the light-incident surface 122. Because the first microstructures 140 and the second microstructures 160 intersect with each other, the second extending direction D2 is different from the first extending direction D1. In one embodiment, the first extending direction D1 is vertical to the second extending direction D2, but the present invention is not limited thereto. It is noted that the light guide plate 100 with the first microstructures 140 and the second microstructures 160 simultaneously disposed on the light-emitting surface 124 as shown in FIG. 1 is merely used as an example for explanation in the present embodiment, and the present invention is not limited thereto. The first microstructures 140 and the second microstructures 160 may also be simultaneously disposed on the reflecting surface 126.

Figure 2:
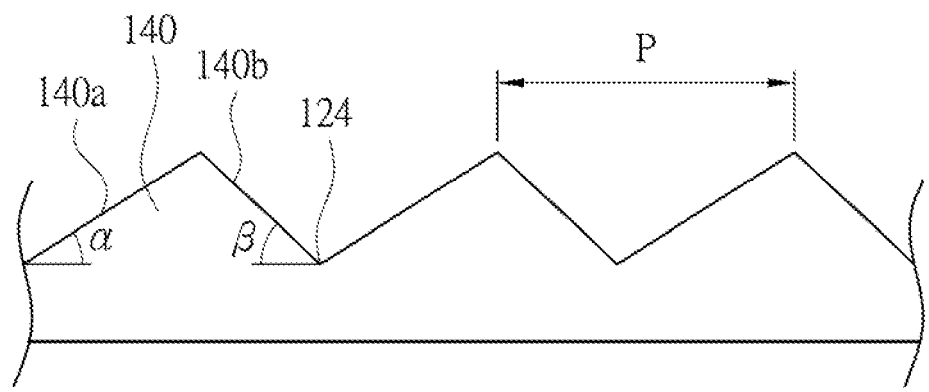
FIG. 2 is a schematic cross-sectional view of one type of first microstructures in accordance with the first embodiment of the present invention.

Referring to FIG. 1 and FIG. 2 simultaneously, FIG. 2 is a schematic cross-sectional view of one type of first microstructures in accordance with the first embodiment of the present invention. In one embodiment, each of the first microstructures 140 may be a convex portion protruding from the light-emitting surface 124, and a cross-sectional profile of each of the first microstructures 140 is in an inverted V-shape. Meanwhile, each of the first microstructures 140 has two surfaces 140a and 140b connected to the light-emitting surface 124. A first angle α and a second angle β are respectively included between the light-emitting surface 124 and two respective surfaces 140a and 140b. In one embodiment, the first angle α and the second angle β are designed corresponding to different beam angles of light beam entering the light guide plate 100, thereby changing the light-emitting beam angles of the light guide plate 100 to increase luminous flux and luminance value of the light guide plate 100. Meanwhile, the shape of each of the first microstructures 140 may be different by changing the first angle α and the second angle β, and a vertical height between a top end of each of the first microstructures 140 and the light-emitting surface 124 may be changed accordingly. In one embodiment, the reflecting surface 126 may be disposed with V-shape structures 180 or other microstructures with similar functions.

Figure 3:
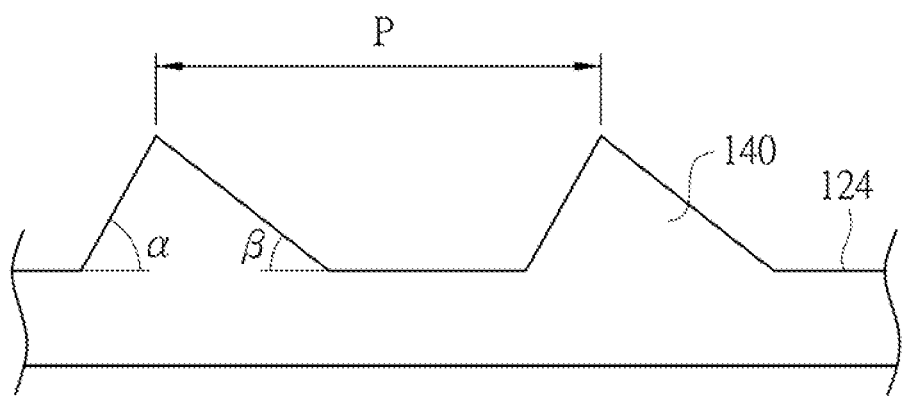
FIG. 3 is a schematic cross-sectional view of another type of first microstructures in accordance with the first embodiment of the present invention.

Referring to FIG. 2 and FIG. 3 simultaneously, FIG. 3 is a schematic cross-sectional view of another type of first microstructures in accordance with the first embodiment of the present invention. In the embodiment of FIG. 2, the first microstructures 140 are arranged contiguously, and the first microstructures 140 are directed connected to each other. In one embodiment of FIG. 3, the first microstructures 140 are arranged discontiguously, and the first microstructures 140 are not connected. It is noted that the first microstructures 140 may be arranged on the light-emitting surface 124 or the reflecting surface 126 in a contiguous manner, a discontiguous manner or a partially contiguous and partially discontiguous manner. Moreover, every two adjacent first microstructures 140 may have an equal or unequal distance P. Therefore, the arrangement density of the first microstructures 140 can be changed by adjusting the distance P between every two adjacent first microstructures 140, thereby changing luminous flux and luminance value of the light guide plate 100 and further increasing luminance uniformity of the light guide plate 100.

Figure 4:
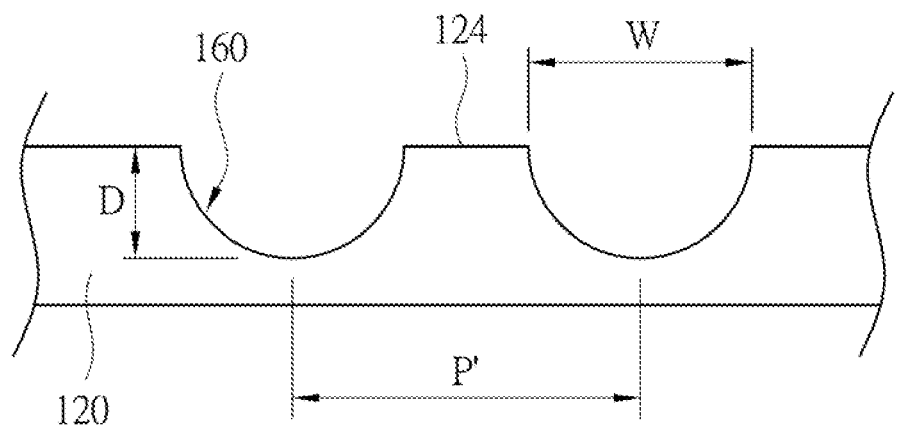
FIG. 4 is a schematic cross-sectional view of one type of second microstructures in accordance with the first embodiment of the present invention.

Referring to FIG. 1 and FIG. 4, FIG. 4 is a schematic cross-sectional view of one type of second microstructures in accordance with the first embodiment of the present invention. In the present embodiment, each of the second microstructures 160 is a concave portion recessed into the light-emitting surface 124, and a cross-sectional profile of each of the second microstructures 160 is in an arc-shape. Moreover, each of the second microstructures 160 is disposed on the light-emitting surface 124 along the first extending direction D1, and intercepts each of the first microstructures 140. In one embodiment, a depth D of the second microstructures 160 becomes gradually smaller from the end of each of the second microstructures 160 near the light-incident surface 122 to the other end of the second microstructures 160 away from the light-incident surface 122. In one embodiment, a distance between every two remaining first microstructures 140 after being intercepted by the second microstructures 160 and a length of each of the remaining first microstructures 140 can be changed by adjusting the depth D and a width W of each of the second microstructures 160. Therefore, the optical trends of the light guide plate 100 can be changed by adjusting the depth D and the width W of each of the second microstructures 160.

Figure 5:
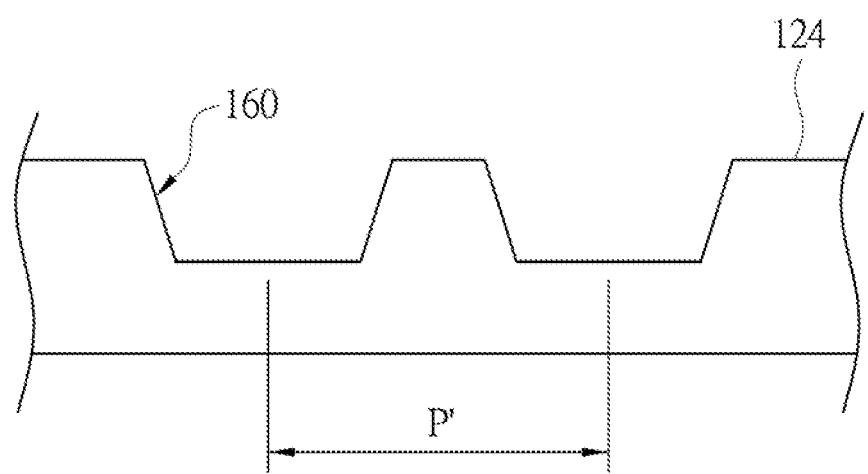
FIG. 5 is a schematic cross-sectional view of another type of second microstructures in accordance with the first embodiment of the present invention.

Referring to FIG. 5, FIG. 5 is a schematic cross-sectional view of another type of second microstructures in accordance with the first embodiment of the present invention. In the present embodiment, a cross-sectional profile of each of the second microstructures 160 is in a trapezoid-shape. In one embodiment, a cross-sectional profile of each of the second microstructures 160 is in a V-shape. In other embodiments, a cross-sectional profile of each of the second microstructures 160 may be formed by a R-cut knife, a V-cut knife, a flat knife or a polycrystalline knife. Different cross-sectional profiles of the second microstructures 160 can achieve different light-condensing effects.

It is noted that the second microstructures 160 shown in FIG. 4 and FIG. 5 are not connected. However, in some embodiments, the second microstructures 160 may be connected to each other and be arranged contiguously. Moreover, every two adjacent second microstructures 160 may have an equal or unequal distances P'. Therefore, the arrangement density of the second microstructures 160 can be changed by adjusting the distance P' between every two adjacent second microstructures 160, thereby increasing light-guiding function of the light guide plate 100.

Figure 6:
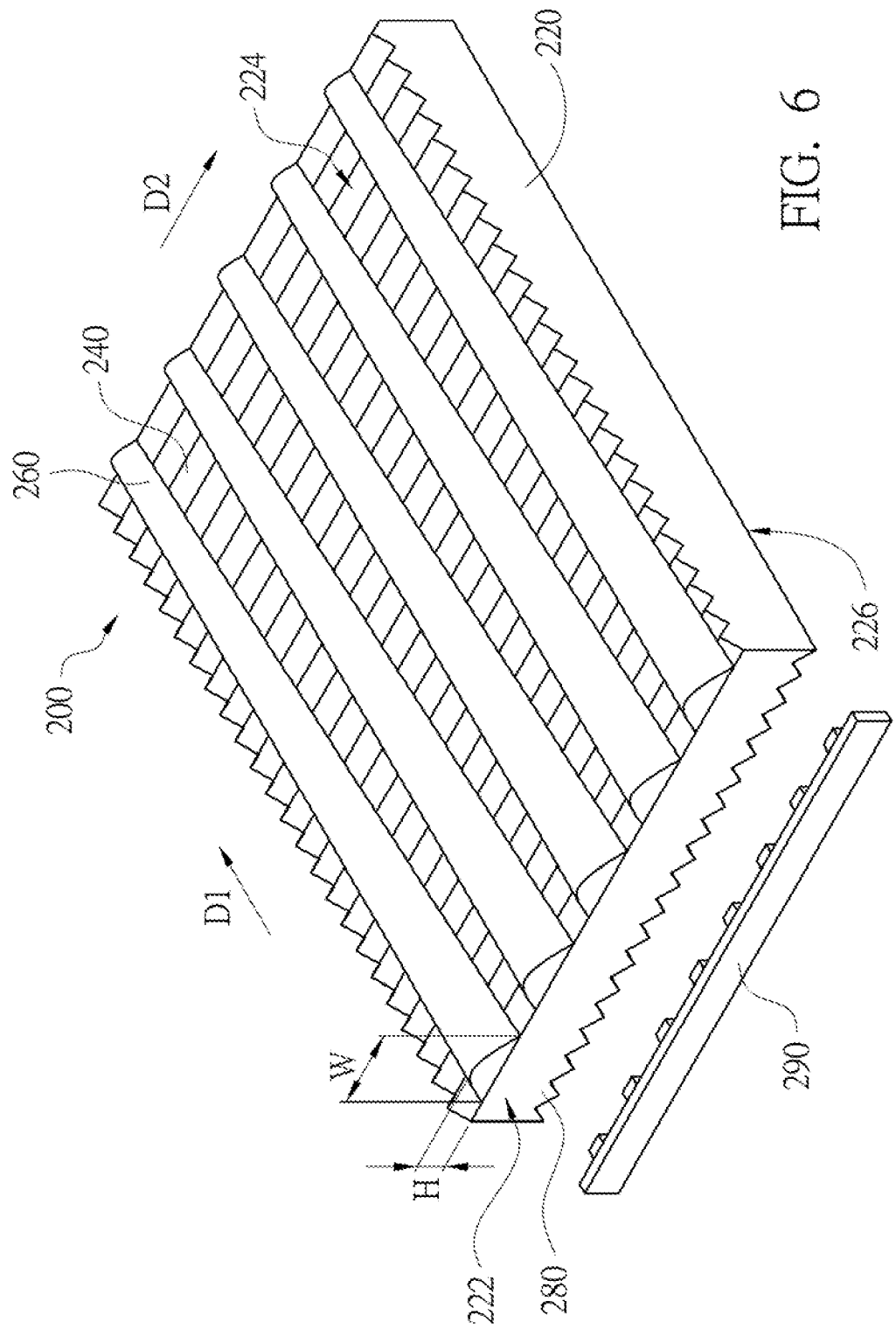
FIG. 6 is a schematic structural diagram showing a light guide plate with multi-directional structures in accordance with a second embodiment of the present invention.

Referring to FIG. 6, FIG. 6 is a schematic structural diagram showing a light guide plate 200 with multi-directional structures in accordance with a second embodiment of the present invention. The light guide plate 200 of the present embodiment includes a main body 220, a plurality of first microstructures 240 and a plurality of second microstructures 260. The main body 220 mainly includes a light-incident surface 222, a light-emitting surface 224 and a reflecting surface 226. A light source 290 is disposed by the light-incident surface 222, and light emitted by the light source 290 may enter the light guide plate 200 from the light-incident surface 222. Each of the first microstructures 240 and each of the second microstructures 260 are convex portions protruding from the light-emitting surface 224. The cross-sectional profiles of the first microstructures 240 and the second microstructures 260 are respectively in inverted V-shape and arc-shape. Each of the first microstructures 240 is arranged on the light-emitting surface 224 along the first extending direction D1. Meanwhile, each of the second microstructures 260 is arranged on the light-emitting surface 224 along the second extending direction D2 and intercepts the first microstructures 240. Each of the second microstructures 260 is in a single stripe pattern. Furthermore, a width W of each of the second microstructures 260 becomes smaller from one end of each of the second microstructures 260 near the light-incident surface 222 to the other end of each of the second microstructures 260 away from the light-incident surface 222. In other embodiments, a height H of each of the second microstructures 260 becomes smaller from one end of each of the second microstructures 260 near the light-incident surface 222 to the other end of each of the second microstructures 260 away from the light-incident surface 222.

Similarly, in one embodiment, a distance between every two remaining first microstructures 240 after being intercepted by the second microstructures 260 and a length of each of the remaining first microstructures 240 can be changed by adjusting the height H and the width W of each of the second microstructures 260. Therefore, the optical trends of the light guide plate 200 can be changed by adjusting the height H and the width W of each of the second microstructures 260. In one embodiment, the reflecting surface 226 may be disposed with V-shape structures 280 or other microstructures with similar functions.

Figure 7:
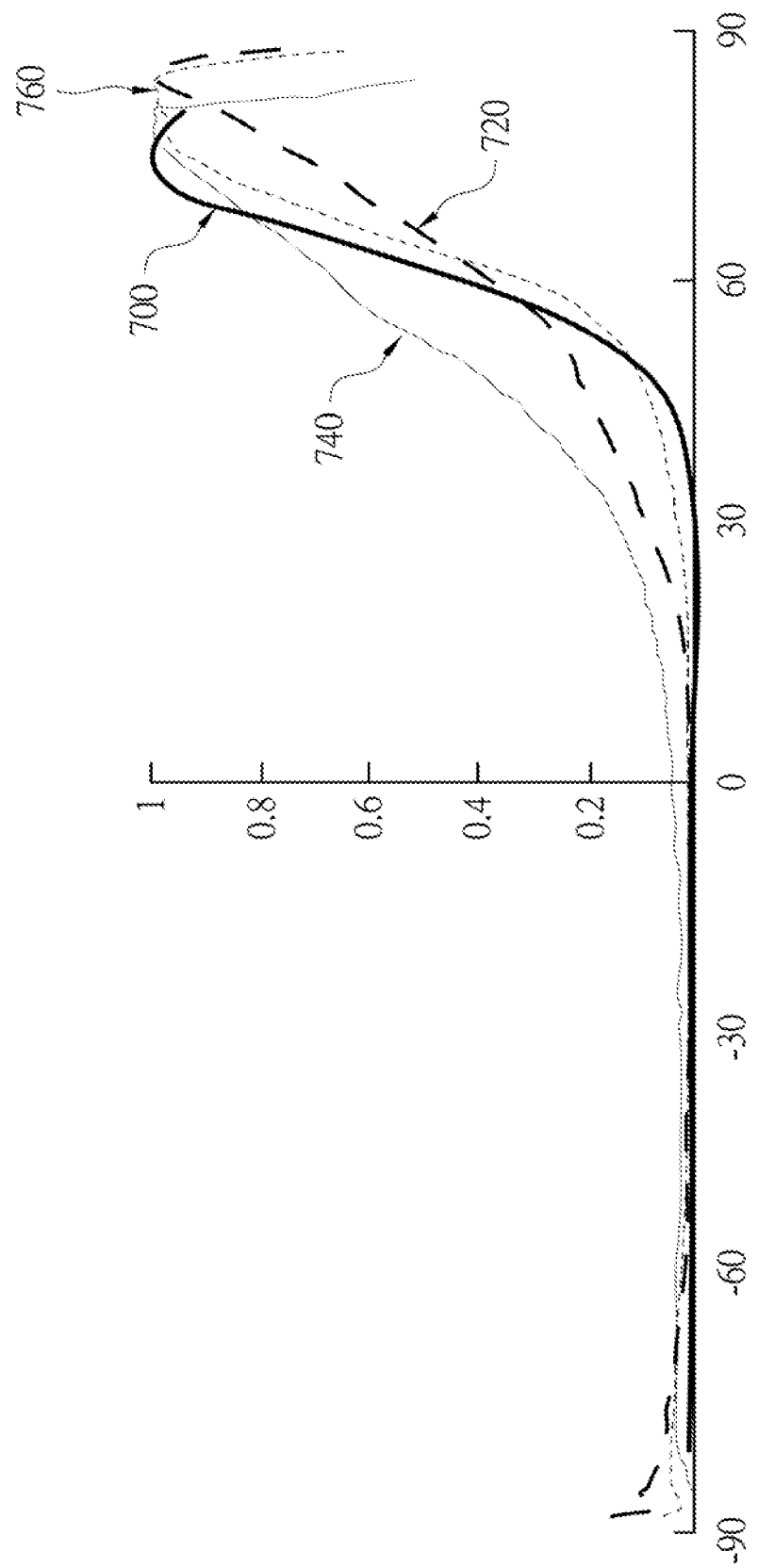
FIG. 7 is a candlepower distribution curve generated from a light guide plate respectively in accordance with a third embodiment of the present invention, a first comparative example, a second comparative example and a third comparative example.

Comparisons between a third embodiment and the conventional light guide plates are described below. Referring to FIG. 7, FIG. 7 is a candlepower distribution curve generated from a light guide plate respectively in accordance with the third embodiment of the present invention, a first comparative example, a second comparative example and a third comparative example. The light guide plate in the third embodiment has V-shape structures disposed on the light-emitting surface, and the first microstructures and the second microstructures disposed on the reflecting surface. A light guide plate in the first comparative example has dotted structures disposed on one single surface. A light guide plate in the second comparative example has V-shape structures disposed on the light-emitting surface, and dotted structure disposed on the reflecting surface. A light guide plate in the third comparative example has V-shape structures with different extending directions respectively disposed on the light-emitting surface and the reflecting surface. As shown in FIG. 7, the bold curve 700 represents a simulation result using the light guide plate of the third embodiment. In comparison with curves 720, 740 and 760 showing respective results in accordance with the first comparative example, the second comparative example and the third comparative example, the curve 700 is smoother, meaning that light field distribution angle can be effectively controlled by disposing the first microstructures and the second microstructures intersected with each other. In the curves 720, 740 and 760 of the first comparative example, the second comparative example and the third comparative example, the un-smooth areas thereof represent noises of light energy loss, meaning that the control effect of the light field distribution angle is poor.

Referring to Table 1, Table 1 is a comparison table of luminance obtained by respectively using the light guide plates of the aforementioned the third embodiment, the first comparative example, the second comparative example and the third comparative example collocated with three optical films and four optical films. As shown in Table 1, in the third comparative example, the V-shape structures with different extending directions respectively disposed on the light-emitting surface and the reflecting surface of the light guide plate help to increase luminance. However, the light guide plate of the third comparative example may cause an adhesion problem between the light guide plate and the optical films and an appearance problem of bright and dark lines. On the contrary, in the third embodiment, because the light guide plate has the first microstructures and the second microstructures disposed on the reflecting surface, not only the aforementioned adhesion and appearance problems can be solved, a better luminance effect can be generated.

Figure 8:
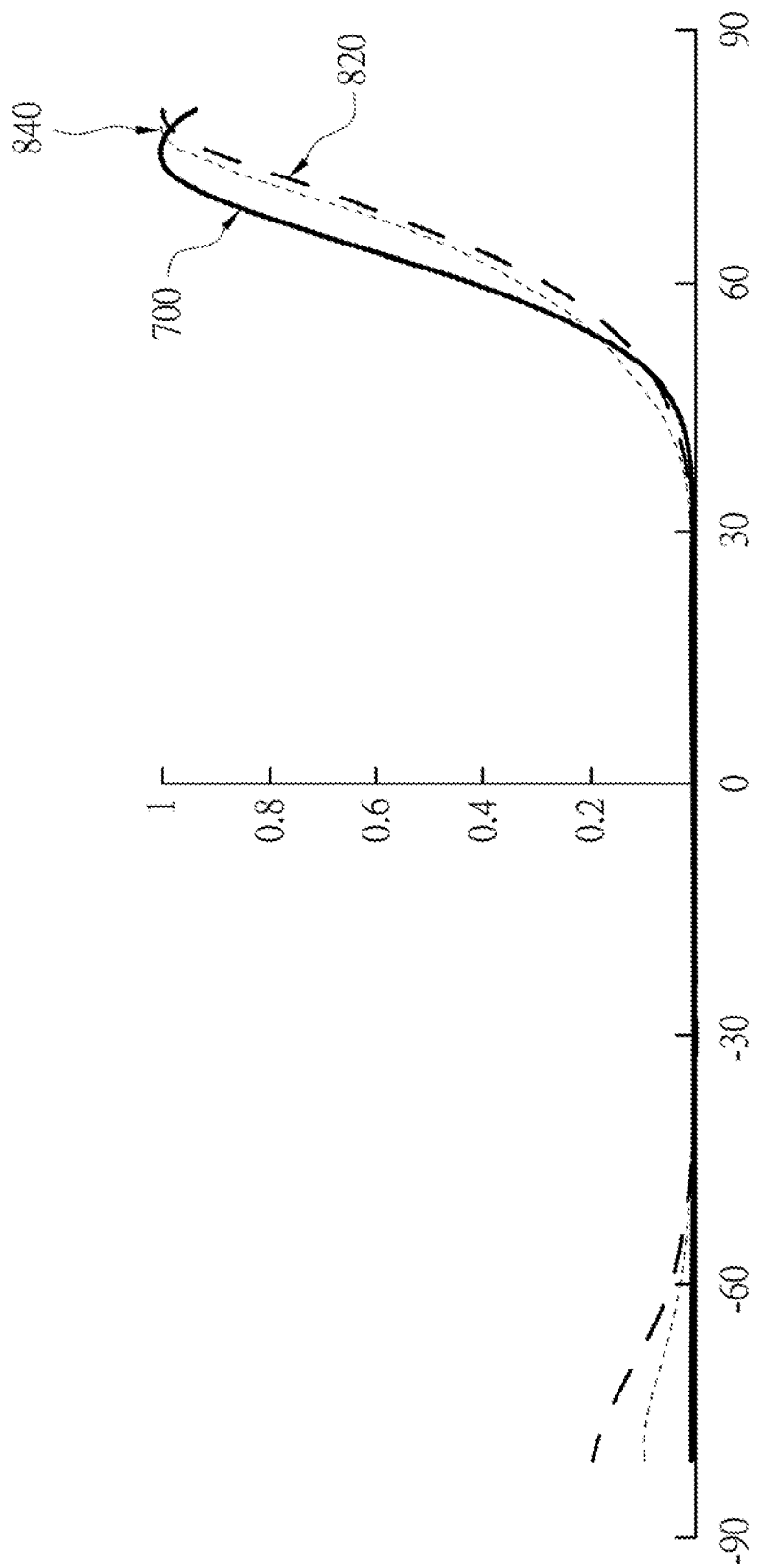
FIG. 8 is a candlepower distribution curve generated from a light guide plate respectively in accordance with a third embodiment of the present invention, a fourth comparative example and a fifth comparative example.

Referring to FIG. 8, FIG. 8 is a candlepower distribution curve generated from a light guide plate respectively in accordance with a third embodiment of the present invention, a fourth comparative example and a fifth comparative example. A Light guide plate in the fourth comparative example has V-shape structures disposed on the light-emitting surface, and sandblasting structures disposed on the reflecting surface. A Light guide plate in the fifth comparative example has vertical V-shape structures disposed on the light-emitting surface, and micro lens disposed on the reflecting surface. As shown in FIG. 8, the bold curve 700 represents a simulation result using the light guide plate of the third embodiment. In comparison with curves 820 and 840 showing respective results in accordance with the fourth comparative example and the fifth comparative example, the curve 700 is smoother, meaning that light field distribution angle can be effectively controlled by disposing the first microstructures and the second microstructures intersected with each other. In the curves 820 and 840 of the fourth comparative example and the fifth comparative example, the un-smooth areas thereof represent noises of light energy loss, meaning that the control effect of the light field distribution angle is poor.

Referring to Table 2, Table 2 is a comparison table of luminance obtained by respectively using the light guide plates of the aforementioned the fourth comparative example and the fifth comparative example collocated with a turning film. As shown in Table 2, luminance effect obtained by the light guide plate in the third embodiment is apparently better than the light guide plate in the fourth comparative example and the light guide plate in the fifth comparative example.

TABLE 2

Comparison table of luminance obtained by respectively using different light guide plates collocated with a turning film

|  | fourth comparative example | fifth comparative example | third embodiment |
| --- | --- | --- | --- |
| luminance | 5356 (nit) | 4329 (nit) | 7177 (nit) |
| gain | 1.0 | 0.81 | 1.34 |

In other embodiments, the light guide plates 100 and 200 with the first microstructures 140 and 240 and the second microstructures 160 and 260 can achieve the objects of adjusting light-emitting beam angles and optical trends of the light guide plates 100 and 200. Meanwhile, at least one portion of surfaces of the first microstructures 140 and 240 or the second microstructures 160 and 260 may be formed as hazy surfaces, matte surfaces, hair-lined surfaces or rough surfaces by a sandblasting or laser treatment, so as to increase dimming effect of the first microstructures 140 and 240 and the second microstructures 160 and 260.

TABLE 1

Comparison table of luminance obtained by respectively using different light guide plates collocated with three optical films and light guide plate collocated with four optical films

|  |  | first comparative example | second comparative example | third comparative example | third embodiment |
| --- | --- | --- | --- | --- | --- |
| three optical films | luminance | 4551 (nit) | 4958 (nit) | 5201 (nit) | 5354 (nit) |
|  | gain | 1.0 | 1.04-1.08 | 1.14 | 1.18 |
| four optical films | luminance | 3831 (nit) | 4983 (nit) | 5297 (nit) | 5483 (nit) |
|  | gain | 0.84-1 | 1-1.1 | 1.16 | 1.20 |

According to the aforementioned embodiments of the present invention, the present invention can simultaneously control light-emitting angles and optical trends of the light guide plate by alternately disposing first microstructures and second microstructures on the same plane of the light guide plate, thereby achieving more uniform light-mixing and light emitting effects. Furthermore, the uniformity of the overall light-emitting appearance of the light guide plate can be promoted by roughening or hazing the surfaces of the first microstructures and second microstructures. In addition, the aforementioned first microstructures and second microstructures can be manufactured by using the existing microstructure processes or equipment without needing to additionally purchase new process equipment, and thus no additional cost burden is imposed to the manufacturing process.

Although the present invention has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. A light guide plate with multi-directional structures, the light guide plate comprising:
    a main body, comprising:
        a light-incident surface;
        a light-emitting surface; and
        a reflecting surface opposite to the light-emitting surface, wherein the light-incident surface connects the light-emitting surface and the reflecting surface;
    a plurality of first microstructures disposed on the light-emitting surface or the reflecting surface, wherein the first microstructures are arranged along a first extending direction from a first side of the main body to an opposite second side of the main body;
    a plurality of second microstructures disposed on the light-emitting surface or the reflecting surface, wherein the second microstructures are arranged along a second extending direction from a third side of the main body to an opposite fourth side of the main body, wherein the second microstructures and the first microstructures are disposed on the same plane and intersect with each other, wherein each of the microstructures is intercepted by each of the second microstructures and each of the second microstructures is in a single stripe pattern and has a width which becomes gradually smaller from one end of each of the second microstructures near the light-incident surface to the other end of each of the second microstructures away from the light-incident surface, so that lengths of the first microstructures are increasing from the first side of the main body near the light-incident surface to the opposite second side of the main body away from the light-incident surface.

2. The light guide plate of claim 1, wherein each of the first microstructures or each of the second microstructures is a convex portion or a concave portion.

3. The light guide plate of claim 2, wherein when each of the second microstructures is the convex portion, a height of the convex portion becomes gradually smaller from the end of each of the second microstructures near the light-incident surface to the other end of each of the second microstructures away from the light-incident surface, wherein when each of the second microstructures is the concave portion, a depth of the concave portion becomes gradually smaller from the end of each of the second microstructures near the light-incident surface to the other end of each of the second microstructures away from the light-incident surface.

4. The light guide plate of claim 1, wherein the first extending direction is vertical to the second extending direction.

5. The light guide plate of claim 1, wherein a cross-sectional profile of each of the first microstructures is in a V-shape or an inverted V-shape, and a first angle and a second angle are respectively included between two respective surfaces of each of the first microstructures and the light-emitting surface or the reflecting surface.

6. The light guide plate of claim 1, wherein a cross-sectional profile of each of the second microstructures is in a V-shape, an inverted V-shape, an arc-shape or a trapezoid-shape.

7. The light, guide plate with multidirectional structures of claim 1, wherein every two adjacent first microstructures are equidistantly arranged, and every two adjacent second microstructures are equidistantly arranged.

8. The light, guide plate with multidirectional structures of claim 1, wherein every two adjacent first microstructures are equidistantly arranged, and every two adjacent second microstructures are non-equidistantly arranged.

9. The light guide plate with multidirectional structures of claim 1, wherein every two adjacent first microstructures are non-equidistantly arranged, and every two adjacent second microstructures are equidistantly arranged.

10. The Light guide plate with multidirectional structures of claim 1, wherein every two adjacent first microstructures are non-equidistantly arranged, and every two adjacent second microstructures are non-equidistantly arranged.

11. The light guide plate with multidirectional structures of claim 1, wherein at least one portion of the first microstructure has a hazy surface, a matte surface, a hair-lined surface or a rough surface.

12. The light, guide plate of claim 1, wherein at least one portion of the second microstructure has a hazy surface, a matte surface, a hair-lined surface or a rough surface.

13. A light, guide plate with multi-directional structures, the tight guide plate comprising:
    a main body having at least one optical surface;
    a plurality of first microstructures disposed on the at least one optical surface, wherein the first microstructures are arranged along a first extending direction from a first side of the main body to an opposite second side of the main body;
    a plurality of second microstructures disposed on the at least one optical surface, wherein the second microstructures are arranged along a second extending direction from a third side of the main body to an opposite fourth side of the main body, wherein the second microstructures and the first microstructures are disposed on the same plane and intersect with each other, wherein each of the first microstructures is intercepted by each of the second microstructures and each of the second microstructures is in a single stripe pattern and has a width which becomes gradually smaller from one end of each of the second microstructures to the other end of each of the second microstructures, so that lengths of the first microstructures are increasing from the first side of the main body near a light-incident surface to the opposite second side of the main body away from the light-incident, surface.

14. The light guide plate of claim 13, wherein each of the first microstructures or each of the second microstructures is a convex portion or a concave portion.

15. The light guide plate of claim 14, wherein when each of the second microstructures is the convex portion, a height of the convex portion becomes gradually smaller from the end of each of the second microstructures to the other end of each of the second microstructures, wherein when each of the second microstructures is the concave portion, a depth of the concave portion becomes gradually smaller from one end of each of the second microstructures to the other end of each of the second microstructures.

16. The light guide plate of claim 13, wherein the first extending direction is vertical to the second extending direction.

17. The light guide plate of claim 13, wherein the at least one optical surface of the main body has a light-emitting surface, and a reflecting surface opposite to the light-emitting surface.

* * * * *